United States Patent
Chen et al.

(10) Patent No.: US 10,476,388 B2
(45) Date of Patent: Nov. 12, 2019

(54) SIMO BASED DC-DC CONVERTERS FOR THERMOELECTRIC ENERGY HARVESTING

(71) Applicant: Leadtrend Technology Corporation, Hsinchu (TW)

(72) Inventors: Po-Hung Chen, Hsinchu (TW); Ming-Yan Fan, Hsinchu (TW)

(73) Assignee: LEADTREND TECHNOLOGY CORPORATION, Hsinchu (TW)

( * ) Notice: Subject to any disclaimer, the term of this patent is extended or adjusted under 35 U.S.C. 154(b) by 78 days.

(21) Appl. No.: 14/850,799

(22) Filed: Sep. 10, 2015

(65) Prior Publication Data

US 2016/0218620 A1    Jul. 28, 2016

(30) Foreign Application Priority Data

Jan. 22, 2015    (TW) .............................. 104102059 A (51) Int. Cl.
*H02M 3/158* (2006.01)
*H02M 1/00* (2006.01)

(52) U.S. Cl.
CPC ...... *H02M 3/158* (2013.01); *H02M 2001/009* (2013.01)

(58) Field of Classification Search
CPC .................. H02M 3/158; H02M 2001/009
USPC ....................................................... 323/271
See application file for complete search history.

(56) References Cited

U.S. PATENT DOCUMENTS

| | | | | |
|---|---|---|---|---|
| 2008/0158915 | A1* | 7/2008 | Williams | H02M 3/07 363/21.06 |
| 2009/0040794 | A1* | 2/2009 | Williams | H02M 3/1588 363/21.14 |
| 2014/0103891 | A1* | 4/2014 | Stratakos | G05F 1/67 323/271 |
| 2014/0266121 | A1* | 9/2014 | Wee | H02M 3/157 323/283 |
| 2014/0354251 | A1* | 12/2014 | Williams | H02M 3/158 323/271 |

* cited by examiner

*Primary Examiner* — Nguyen Tran
*Assistant Examiner* — Monica Mata
(74) *Attorney, Agent, or Firm* — McClure, Qualey & Rodack, LLP (57) ABSTRACT

A single-inductor multiple-output (SIMO) power converter converts an input voltage into an output voltage and a biasing voltage. The SIMO power converter comprises an inductor and a primary power switch, and a control circuit. The inductor is configured for storing energy from the input voltage. The primary power switch has a control node and is connected between the inductor and the output voltage which powers an output load. The control circuit controls the primary power switch comprising an auxiliary power switch and a driver. The auxiliary power switch is connected between the inductor and the biasing voltage. The driver, powered by the biasing voltage, drives the control node. The biasing voltage determines a signal level at the control node. The primary power switch and the auxiliary power switch are controlled to distribute the energy stored in the inductor to the output voltage and the biasing voltage.

20 Claims, 7 Drawing Sheets

SIMO BASED DC-DC CONVERTERS FOR THERMOELECTRIC ENERGY HARVESTING

CROSS-REFERENCE TO RELATED APPLICATION

This application claims priority to and the benefit of Taiwan Application Series Number 104102059 filed on Jan. 22, 2015, which is incorporated by reference in its entirety.

BACKGROUND

The present disclosure relates generally to single-inductor multiple-output (SIMO) based DC-DC converters, more especially to SIMO based converters with adaptive gate biasing (AGB) technique for thermoelectric energy harvesting.

Energy harvested from the environment can be used to develop battery-free electronics systems or prolong battery life. Among the different green energy sources from ambient environment such as light, motion, and heat, thermal power from human body is an efficient and reliable energy source for wearable applications. However, the output voltage of thermoelectric generators (TEGs) is typically less than 100 mV for a thermal difference of 2K depending on the temperature dependent output characteristics range of 10 mV/K to 50 mV/K. Moreover, considering the limited power budget of TEGs, the load system typically requires digital circuits operating in the near-threshold region to reduce power dissipation. Therefore, a power converter that can convert the harvested energy to a near-threshold output is required to realize an energy efficient system. However, designing a high efficiency low-$V_{IN}$ low-$V_{OUT}$ converter is challenging owing to the significant conduction losses ($P_{CONDUCTION}$) in power transistors.

Figure 1:
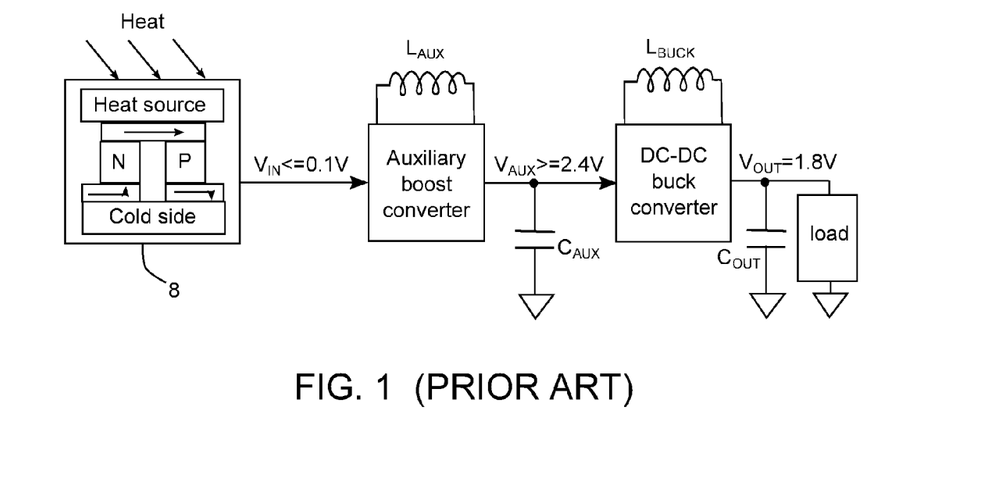
FIG. 1 shows a thermoelectric energy harvesting power converter in the art.

Numerous thermoelectric energy harvesting power converters have been proposed in the art for low $V_{IN}$ and low power operation. However, the output stages of these power converters are greater than 0.9V. A two-stage topology with a cascaded auxiliary boost converter and a DC-DC buck converter has been proposed, as shown in FIG. 1. An auxiliary boost converter with an additional off-chip inductor $L_{AUX}$ acts as a buffer, and the DC-DC buck converter maintains the $V_{OUT}$ value at 1.8V. With this two-stage topology, the low $V_{IN}$ and low $V_{OUT}$ specifications can be realized because $V_{OUT}$ can be regulated to any desired level. However, this structure in FIG. 1 has low efficiency because of the two-stage conversion and high conversion ratio in the auxiliary boost converter.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

Figure 2:
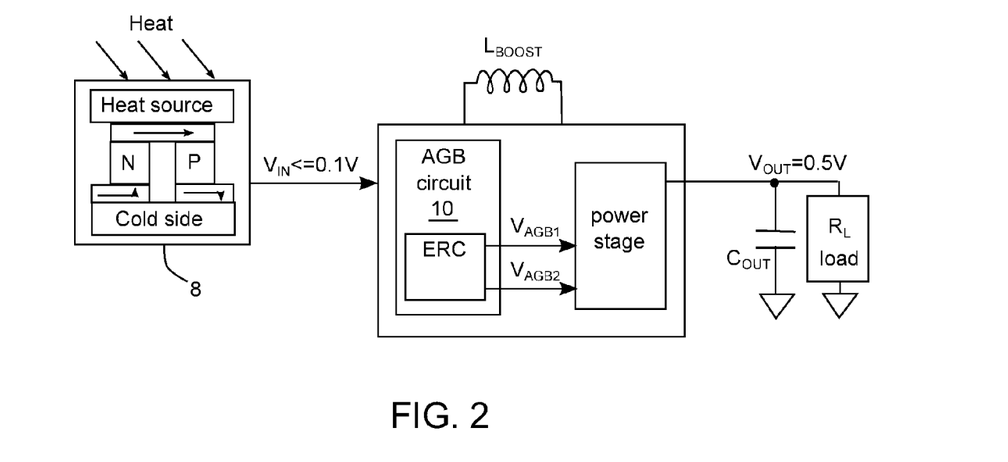
FIG. 2 shows a single-stage power converter according to embodiments of the invention.

An embodiment of the invention introduces a 100 mV $V_{IN}$, 500 mV $V_{OUT}$ high-efficiency SIMO-based boost converter for harvesting thermoelectric energy generated by thermoelectric generators. FIG. 2 shows a single-stage power converter according to embodiments of the invention, which employs adaptive gate biasing (AGB) technique and near-threshold voltage (near-$V_{TH}$) energy redistribution control (ERC). To improve the conversion efficiency at low $V_{OUT}$, two key techniques are used. (1) An AGB technique that provides dual load-dependent voltages (gate biasing voltages $V_{AGB1}$ and $V_{AGB2}$) for driving the power transistors of the primary boost converter. This technique improves the conversion efficiency by reducing $P_{CONDUCTION}$ and switching loss ($P_{SWITCHING}$) at different load conditions and providing a self-calibration mechanism against $V_{TH}$ variation. (2) A near-$V_{TH}$ ERC mechanism that is powered by $V_{OUT}$ and manages the power delivery strategy of output voltage $V_{OUT}$, $V_{AGB1}$, and $V_{AGB2}$. One embodiment of the invention achieves a maximum efficiency of 83.4% at an output power ($P_{OUT}$) of 250 uW, and power efficiency greater than 80% over the output power range of 150 uW to 450 uW. In addition, the core controller is implemented using 7-bit delay-line based digital pulse width modulation (DPWM), which not only reduces the quiescent power to 0.48 uW but also ensures reliable digital operation with the near-$V_{TH}$ power supply form output voltage $V_{OUT}$.

Figure 3:
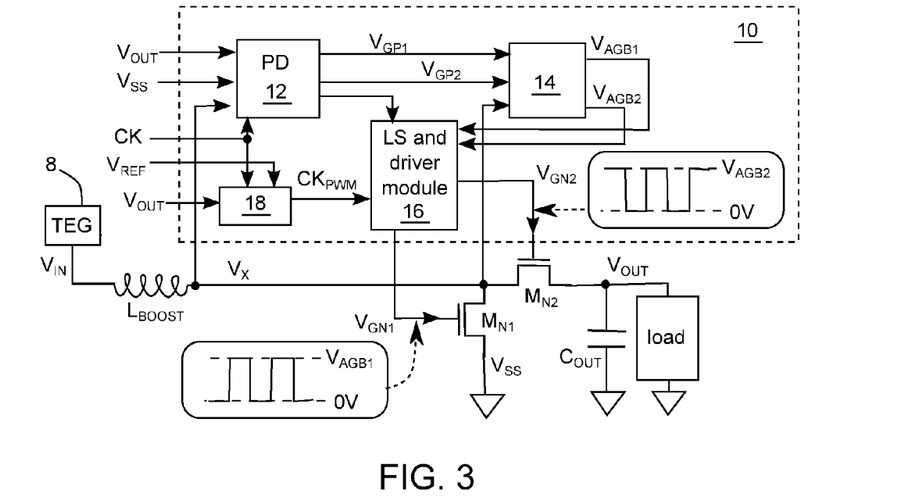
FIG. 3 shows a conceptual block diagram of the AGB technique.

FIG. 3 shows a conceptual block diagram of the AGB technique. PWM generator 18 in the AGB circuit 10 provides digital PWM signal $CK_{PWM}$ based on a clock signal CK, output voltage $V_{OUT}$ and reference voltage $V_{REF}$. The $P_{OUT}$ detector 12, powered by output voltage $V_{OUT}$, senses the voltage difference between $V_X$ and $V_{SS}$ when $M_{N1}$ is ON, and the voltage difference between $V_X$ and $V_{OUT}$ when $M_{N2}$ is ON. As indicated in FIG. 3, $V_{SS}$ is the voltage at a ground line and $V_X$ is at the joint node between $M_{N2}$ and $M_{N1}$. Outputs $V_{GP1}$ and $V_{GP2}$ of the $P_{OUT}$ detector 12 control the biasing voltage generator 14 to generate gate biasing voltages $V_{AGB1}$ and $V_{AGB2}$ which perform as power sources for level-shift and driver module 16. Based on the PWM signal $CK_{PWM}$ and outputs of the $P_{OUT}$ detector 12, level-shifter and driver module 16 provides gate control signals $V_{GN1}$ and $V_{GN2}$, whose signal levels are determined by gate biasing voltages $V_{AGB1}$ and $V_{AGB2}$ respectively. Therefore, this AGB technique can reduce $P_{CONDUCTION}$ and $P_{SWITCHING}$ by providing appropriate gate overdrive voltages. It also precludes output voltage $V_{OUT}$ from a tradeoff between output load demand and the performance of the power converter and compensates for threshold voltage $V_{TH}$ shift due to process or temperature variation. The operation principle and implementation of the AGB technique are described in detail below.

Figure 4A:
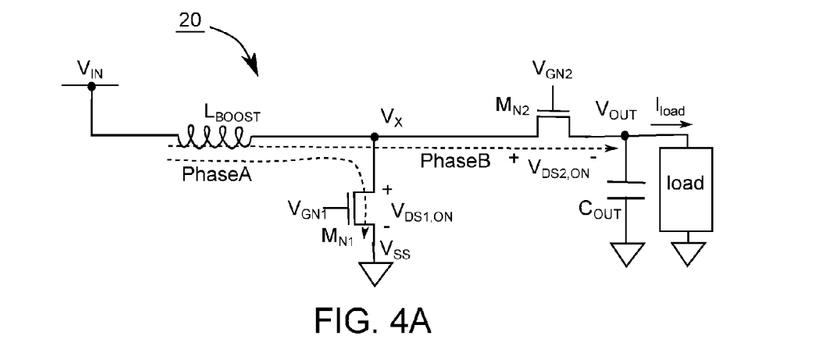
FIG. 4A shows the circuit schematic of the primary boost converter 20 in FIG. 3.

FIG. 4A shows the circuit schematic of the primary boost converter 20 in FIG. 3. This primary boost converter 20 includes an inductor $L_{BOOST}$, N-type power transistors $M_{N1}$ and $M_{N2}$, and the output capacitor $C_{OUT}$. This primary boost converter 20 stores energy when the power transistor $M_{N1}$ turns ON ($M_{N2}$ turns OFF) to operate under status PhaseA. The stored energy is then delivered to output voltage $V_{OUT}$ when the power transistor $M_{N2}$ turns ON ($M_{N1}$ turns OFF) to operate at status PhaseB. In one embodiment, because output voltage $V_{OUT}$ is targeted to be 0.5V, in the near-$V_{TH}$ region, an N-type power transistor $M_{N2}$ is employed as the high-side power transistor. Compared with a P-type transistor, an N-type power transistor has higher mobility and superior area efficiency. In addition, only a positive voltage is required for driving an N-type power transistor whereas a voltage ranging from positive to negative potential is essential for a P-type transistor to effectively implement the AGB algorithm. Therefore, in one embodiment, no additional negative voltage converter is required and implemented, and the complexity of the circuit design is reduced.

To simplify the analysis, it is assumed that the primary boost converter 20 operates under continuous conduction mode (CCM), and the inductor current ripple is negligible. In a steady state, $P_{CONDUCTION}$ of power transistors $M_{N1}$ and $M_{N2}$ can be expressed as $$P_{CONDUCTION} = P_{MN1} + P_{MN2} \quad (1)$$

$$= \int_0^{DT} I_L^2 R_{DS1,ON} \, dt + \int_{DT}^T I_L^2 R_{DS2,ON} \, dt,$$

where $I_L$ is the average inductor current flowing through the inductor $L_{BOOST}$, $R_{DS1,ON}$ and $P_{DS2,ON}$ are the on-resistances of power transistors $M_{N1}$ and $M_{N2}$, respectively. Further, T is the clock period, and D is the duty cycle of the signal provided to the power transistor $M_{N1}$ in a steady state. For a boost converter, the relation between $I_L$ and the output load current $I_{LOAD}$ can be expressed as $$I_L = \frac{I_{LOAD}}{1-D}. \quad (2)$$

Therefore, the correlation between $P_{CONDUCTION}$ and $I_{LOAD}$ can be derived as $$P_{CONDUCTION} = \int_0^{DT} \left(\frac{I_{LOAD}}{1-D}\right)^2 R_{DS1,ON} \, dt + \quad (3)$$

-continued
$$\int_{DT}^T \left(\frac{I_{LOAD}}{1-D}\right)^2 R_{DS2,ON} \, dt$$

$$= I_{LOAD}^2 \left(R_{DS1,ON} \frac{DT}{(1-D)^2} + R_{DS2,ON} \frac{T}{1-D}\right).$$

Hence, if the duty cycle, operation frequency, fabrication process and transistor size of the power transistors are known, $P_{CONDUCTION}$ is in proportion to the square of $I_{LOAD}$ and increases dramatically as $I_{LOAD}$ increases, as given by the equation (3).

By detecting the voltage drop across the power transistors and adjusting the corresponding gate biasing voltages, the proposed AGB technique maintains the turn-on voltages $V_{DS1,ON}$ and $V_{DS2,ON}$ to be about constant.

$$V_{DS1,ON} = I_L R_{DS1,ON} = \frac{I_{LOAD}}{1-D} R_{DS1,ON}. \quad (4)$$

$$V_{DS2,ON} = I_L R_{DS2,ON} = \frac{I_{LOAD}}{1-D} R_{DS1,ON}. \quad (5)$$

Therefore, the total conduction loss can be derived from equations (3), (4), and (5) as $$P_{CONDUCTION} = I_{LOAD}\left(V_{DS1,ON} \frac{DT}{1-D} + V_{DS2,ON} \cdot T\right). \quad (6)$$

If turn-on voltages $V_{DS1,ON}$ and $V_{DS2,ON}$ are constant, $P_{CONDUCTION}$ is proportional only to $I_{LOAD}$ in equation (6) instead of the square function in the conventional equation (3). Therefore, under heavy loads, the conversion efficiency can be improved by employing the AGB technique.

Figure 4B:
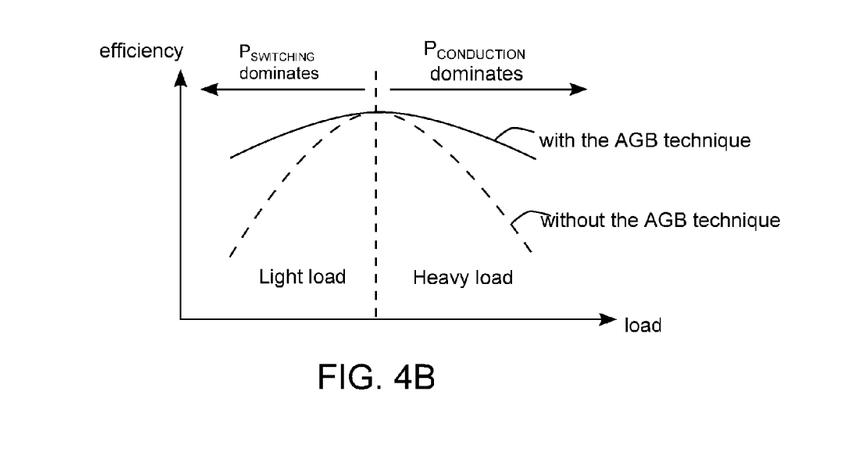
FIG. 4B demonstrates the conversion efficiencies of converters with AGE, technique and without AGB technique respectively.

On the other hand, under light-load conditions, $P_{CONDUCTION}$ decreases due to the reduced $I_L$ flowing through power transistors, and $P_{SWITCHING}$ dominates the overall efficiency. The AGB technique detects the decreasing turn-on voltages $V_{DS1,ON}$ and $V_{DS2,ON}$, and the potentials of $V_{AGB1}$ and $V_{AGB2}$ are simultaneously reduced to maintain the turn-on voltages $V_{DS1,ON}$ and $V_{DS2,ON}$ across the power transistors $M_{N1}$ and $M_{N2}$. Therefore, lower values of gate biasing voltages $V_{AGB1}$ and $V_{AGB2}$ decrease $P_{SWITCHING}$ as given by $$P_{SWITCHING} = f_{CK} C_{GATE1} V_{AGB1}^2 + f_{CK} C_{GATE2} V_{AGB2}^2 \quad (7)$$

where $f_{CK}$ is the operation frequency (=1/T), and $C_{GATE1}$ and $C_{GATE2}$ are the gate capacitances of the power transistors $M_{N1}$ and $M_{N2}$, respectively. Because $P_{SWITCHING}$ is proportional to the square of the gate biasing voltages, $V_{AGB1}$ and $V_{AGB2}$ power efficiency is predicted to be higher with the AGB technique under light load. Therefore, by applying the AGB technique, both light-load and heavy-load efficiencies can be improved, as shown in FIG. 4B. The AGB technique automatically adjusts gate biasing voltages $V_{AGB1}$ and $V_{AGB2}$ according to $I_{LOAD}$, so as to manipulate the on-resistances $R_{DS1,ON}$ and $R_{DS2,ON}$, thus resulting in significant suppression of losses under different load conditions.

AGB circuit 10 in FIG. 3 implements the AGB technique, providing a feedback mechanism to regulate or maintain both turn-on voltages $V_{DS1,ON}$ and $V_{DS2,ON}$ to be about constant, independent from the load condition.

Figure 5:
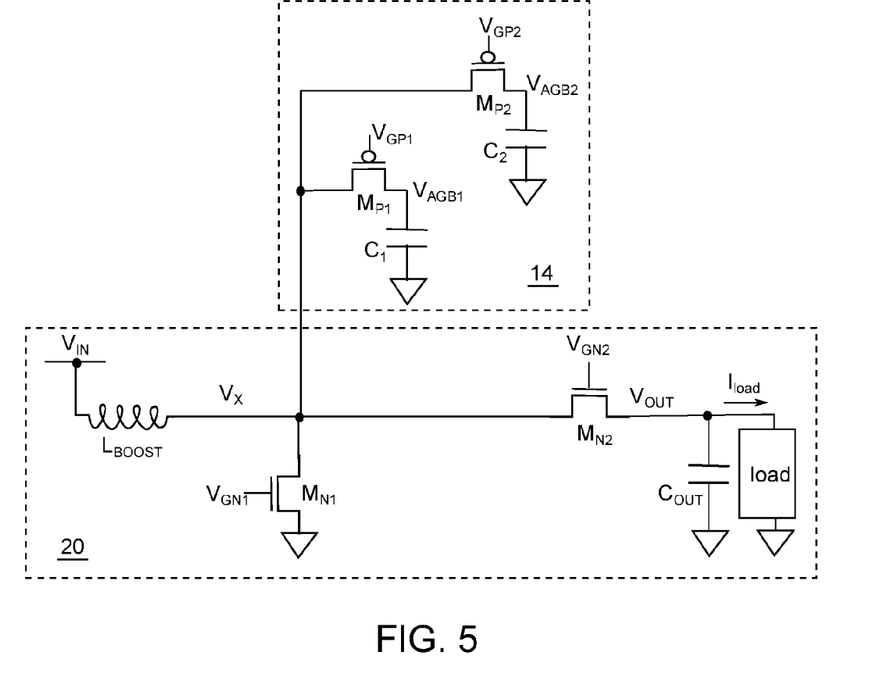
FIG. 5 shows the primary boost converter and the biasing voltage generator 14 in FIG. 3.

FIG. 5 shows the primary boost converter 20 and the biasing voltage generator 14 in FIG. 3, both composing a SIMO to simultaneously generate output voltage $V_{OUT}$, and gate biasing voltages $V_{AGB1}$ and $V_{AGB2}$ Capacitors $C_1$ and $C_2$ are used to stabilize gate biasing voltages $V_{AGB1}$ and $V_{AGB2}$ Inductor $L_{BOOST}$ N-type power transistors $M_{N1}$ and $M_{N2}$, and P-type power transistor $M_{P1}$ and $M_{P2}$ are responsible for the energy stored and released in different time slots within a period T. Energy is delivered from input voltage $V_{IN}$ via being stored in inductor $L_{BOOST}$, and then distributed to the three output terminals through time-multiplexing control accompanied with skipping modulation, which precludes output voltage $V_{OUT}$ from the crosstalk between gate biasing voltages $V_{AGB1}$ and $V_{AGB2}$ and will be discussed later.

Figure 6:
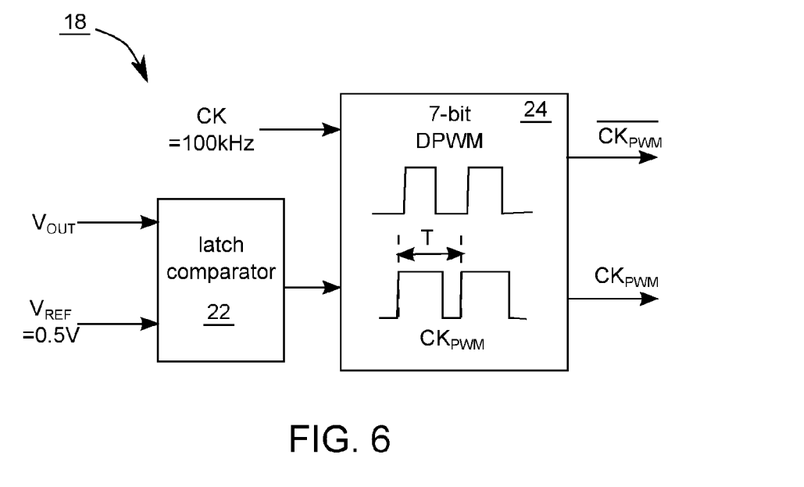
FIG. 6 demonstrates the PWM generator in FIG. 3, including a latch comparator and a 7-bit DPWM (digital PWM) generator.

FIG. 6 demonstrates the PWM generator 18 in FIG. 3, including a latch comparator 22 and a 7-bit DPWM (digital PWM) generator 24. The latch comparator 22 compares output voltage $V_{OUT}$ with a reference voltage $V_{REF}$, which is 0.5V for this embodiment, and controls the duty cycle of DPWM signal $CK_{PWM}$ via the high-resolution DPWM unit 24. For instance, if output voltage $V_{OUT}$ is below reference voltage $V_{REF}$ the duty cycle of DPWM signal $CK_{PWM}$ increases stepwise by a fixed amount. Accordingly, in a steady state, output voltage $V_{OUT}$ could be regulated at the reference voltage $V_{REF}$ To reduce power consumption by DPWM unit 24 and the driver circuit, a clock frequency of 100 kHz is selected in this embodiment, as demonstrated by the reference clock signal CK in FIG. 6.

Figure 7:
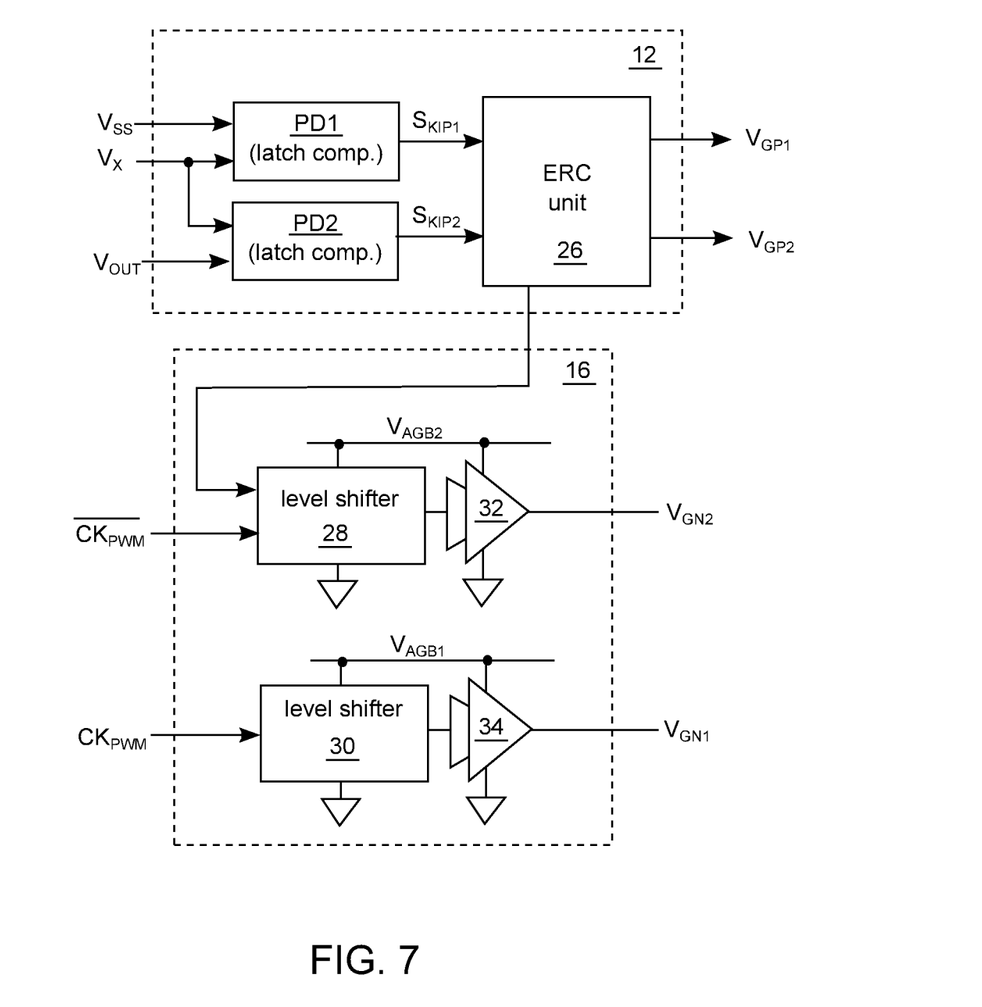
FIG. 7 details the $P_{OUT}$ detector and the level-shift module in FIG. 3.

FIG. 7 details the $P_{OUT}$ detector 12 and level-shift and driver module 16 of FIG. 3. The $P_{OUT}$ detector 12 has latch comparators PD1 and PD2, and ERC unit 26, while the level-shift and driver module 16 has level shifters 28 and 30, and drivers 32 and 34.

Figure 8A:
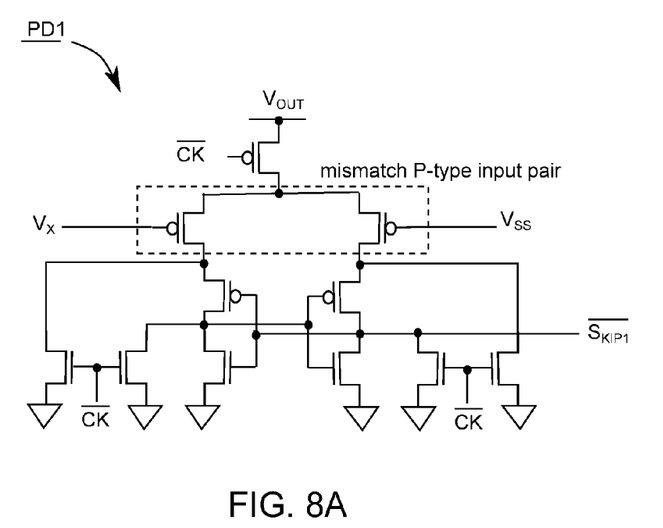
FIGS. 8A and 8B demonstrates the latch comparators PD1 and PD2, respectively.
Figure 8B:
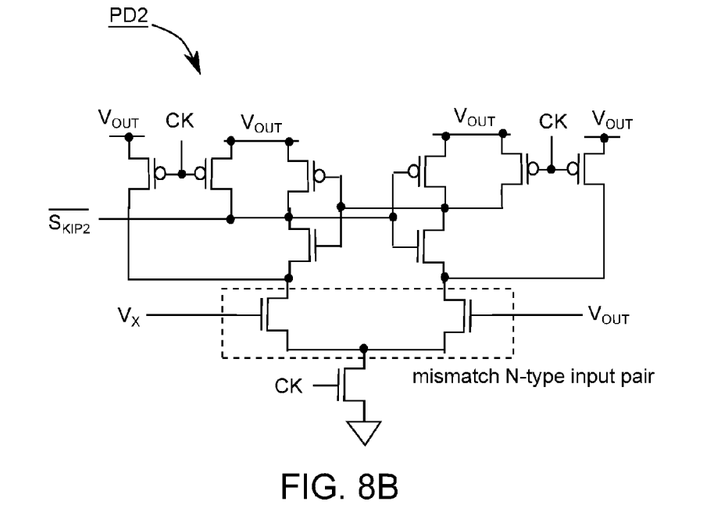

The latch comparator PD1 detects the voltage difference between $V_X$ and $V_{SS}$ during the ON time of the power transistor $M_{N1}$. In other words, it detects the turn-on voltage $V_{DS1,ON}$, with which a predetermined value $V_{OFFSET1}$ is compared to generate skip signal $S_{KIP1}$ Similarly, the latch comparator PD2 detects the voltage difference between $V_X$ and output voltage $V_{OUT}$, which is the turn-on voltage $V_{DS2,ON}$ Turn-on voltage $V_{DS2,ON}$ is compared with a predetermined value $V_{OFFSET2}$ to generate skip signal $S_{KIPS}$. When $S_{KIP1}$ is "1" in logic, it means turn-on voltage $V_{DS1,ON}$ is below or equal to the predetermined value $V_{OFFSET1}$. When $S_{KIP1}$ is "0" in logic, turn-on voltage $V_{DS1,ON}$ exceeds the predetermined value $V_{OFFSET1}$. Skip signal $S_{KIP2}$ in logic "1" means the turn-on voltage $V_{DS2,ON}$ is below or equal to the predetermined value $V_{OFFSET2}$, while that in logic "0" means the turn-on voltage $V_{DS2,ON}$ exceeds the predetermined value $V_{OFFSET2}$. The latch comparators PD1 and PD2 are illustrated in FIGS. 8A and 8B, respectively. The predetermined value $V_{OFFSET1}$ is implemented using the intentionally mismatched PMOSFET input pair in FIG. 8A, and the predetermined value $V_{OFFSET2}$ is implemented using the intentionally mismatched NMOSFET input pair in FIG. 8B. In FIG. 7, ERC unit 26 decides whether to pull low gate control signals $V_{GP1}$ and $V_{GP2}$ at corresponding time slots, depending on skip signals $S_{KIP1}$ and $S_{KIP2}$.

Figure 9:
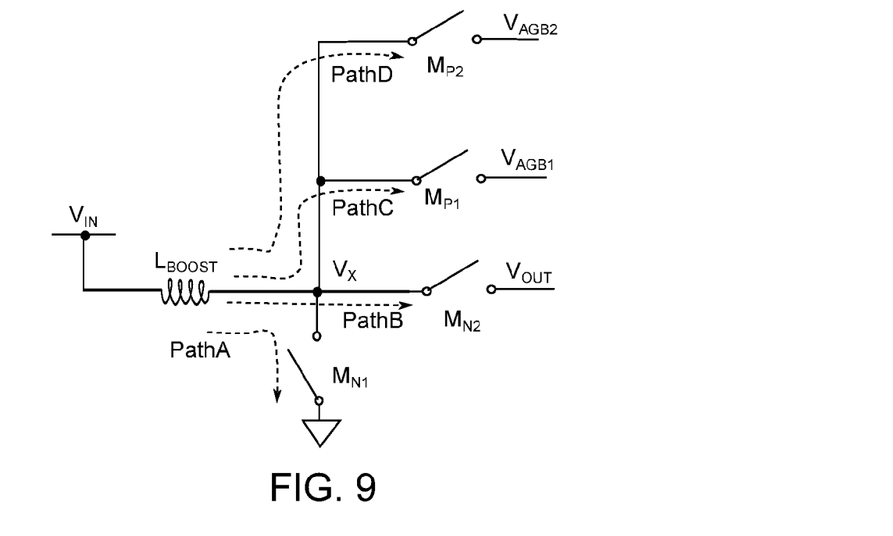
FIG. 9 shows four different operation statuses PathA, PathB, PathC, and PathD for the SIMO of FIG. 5.
Figure 10A:
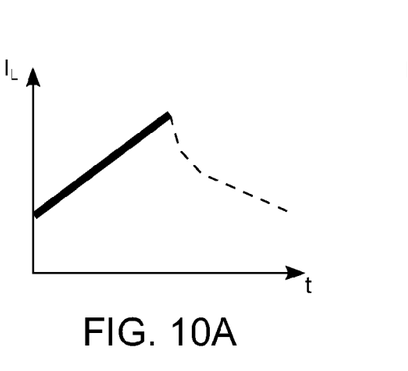
FIGS. 10A, 10B, 10C and 10D show the inductor current waveforms when the SIMO of FIG. 5 operates at the four statuses, respectively.
Figure 10B:
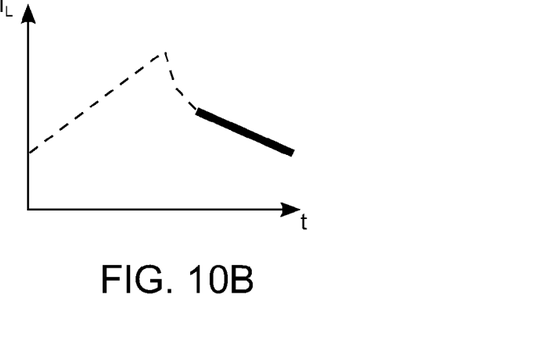
Figure 10C:
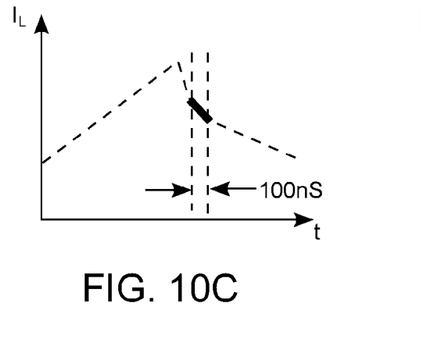
Figure 10D:
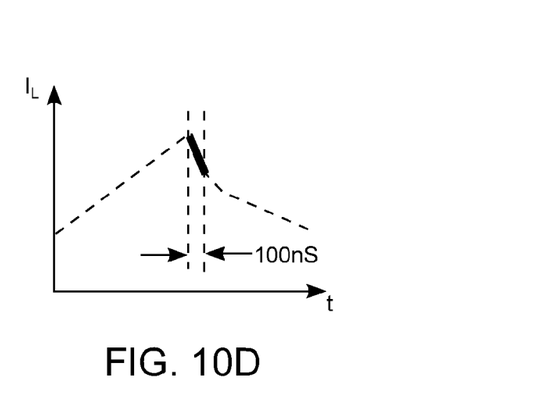

FIG. 9 shows four different operation statuses PathA, PathB, PathC, and PathD for the SIMO of FIG. 5. FIGS. 10A, 10B, 10C and 10D show the inductor current waveforms when the SIMO of FIG. 5 operates at the four statuses, respectively. Under operation status PhaseA, power transistor $M_{N1}$ turns ON and the energy is stored from input voltage $V_{IN}$ in inductor $L_{BOOST}$, and the duty cycle $CK_{PWM}$ for this time slot is determined by the 7-bit DPWM unit 24. Part of the energy accumulated in status PhaseA is then distributed to gate biasing voltage $V_{AGB2}$ under the status PhaseD, via the turn-on of power transistor $M_{P2}$, where gate biasing voltage $V_{AGB2}$ is the highest voltage in this system for this embodiment. Sequentially and similarly, the energy accumulated in status PhaseA is partially provided for gate biasing voltage $V_{AGB1}$ under the status PhaseC, via the turn-on of power transistor $M_{P1}$. Finally, output voltage $V_{OUT}$ receives the rest of the accumulated energy under status PhaseB to fulfill the output load. Even though the status sequence shown in FIGS. 10A to 10D is (PhaseA, PhaseD, PhaseC, PhaseB), this invention is not limited to, and a different status sequence is possibly employed in another embodiment. Statuses PhaseD and PhaseC are necessary for generating adaptive gate biasing voltages $V_{AGB1}$ and $V_{AGB2}$; however, they inevitably cause discontinuous conduction and disturbance for primary output voltage $V_{OUT}$. To overcome this problem, the pulse width of the driving signals provided for power transistors $M_{P1}$ and $M_{P2}$ is limited to 100 ns to restrict the amount of power transferred to gate biasing voltages $V_{AGB1}$ and $V_{AGB2}$. In other words, if any of power transistors $M_{P1}$ and $M_{P2}$ turns ON, the ON time will be always 100 ns. Additionally, status PhaseD is activated only when the turn-on voltage $V_{DS2,ON}$ exceeds the predetermined value $V_{OFFSET2}$ while status PhaseC is activated only when the turn-on voltages $V_{DS1,ON}$ exceeds the predetermined value $V_{OFFSET1}$.

Figure 11:
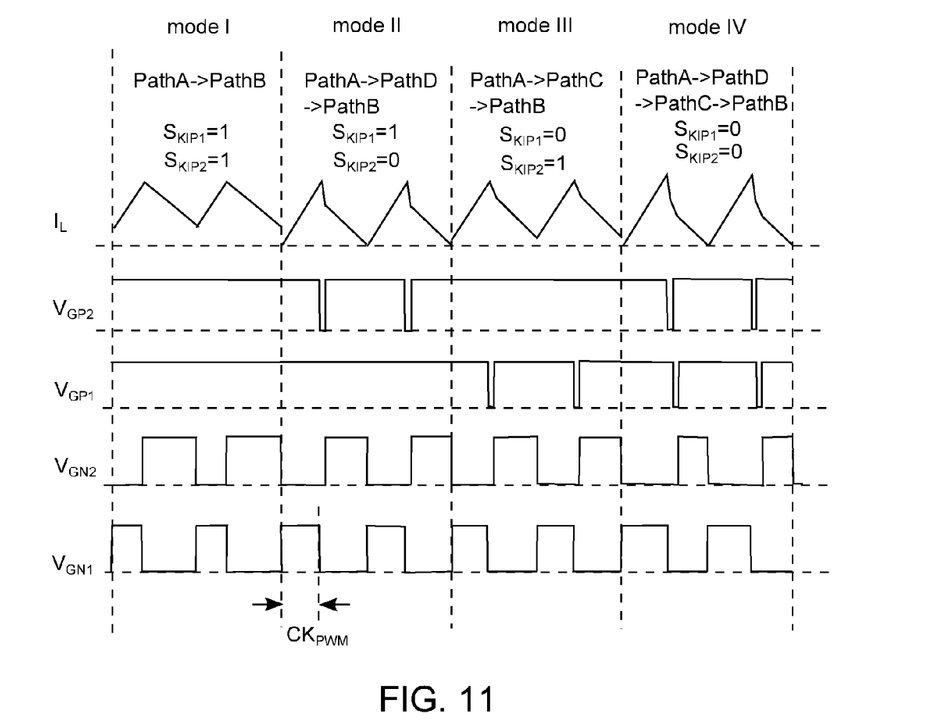
FIG. 11 shows the energy delivery mechanism of near-$V_{TH}$ ERC and skipping modulation in response to skip signals $S_{KIP1}$ and $S_{KIP2}$.

The power consumed by gate biasing voltages $V_{AGB1}$ and $V_{AGB2}$ is typically less than one percent of that of the primary output voltage $V_{OUT}$. Therefore, the ERC unit 26 in FIG. 7 implements a skipping modulation mode to avoid large disparity in load conditions among $V_{AGB1}$, $V_{AGB2}$ and $V_{OUT}$. FIG. 11 shows the energy delivery mechanism of near-$V_{TH}$ ERC and skipping modulation in response to skip signals $S_{KIP1}$ and $S_{KIP2}$ Generally, three output terminals receive energy to maintain their voltage levels, as shown in mode IV when skip signals $S_{KIP1}$ and $S_{KIP2}$ are both "0" in logic. In the mode III when skip signals $S_{KIP1}$ and $S_{KIP2}$ are "0" and "1" respectively, the status PhaseD is skipped and gate biasing voltage $V_{AGB2}$ does not receive energy. Similarly, In the mode II when skip signals $S_{KIP1}$ and $S_{KIP2}$ are "1" and "0" respectively, the status PhaseC is skipped and gate biasing voltage $V_{AGB1}$ does not receive energy. When both the gate biasing voltages $V_{AGB1}$ and $V_{AGB2}$ are high enough to keep the turn-on voltages $V_{DS1,ON}$ and $V_{DS2,ON}$ below or equal to the predetermined values $V_{OFFSET1}$ and $V_{OFFSET2}$ respectively, P-type power transistors $M_{P1}$ and $M_{P2}$ are constantly kept OFF, and both the statuses PhaseC and PhaseD are skipped, as shown in the mode I. If the status PhaseC (PhaseD) is skipped, the gate biasing voltages $V_{AGB1}$ ($V_{AGB2}$) ramps down due to $P_{SWITCHING}$, and the turn-on voltage $V_{DS1,ON}$ ($V_{DS2,ON}$) in a subsequent switch cycle increases as a result. Therefore, by appropriate energy delivery management, the proposed near-$V_T$ ERC and skipping modulation technique ensure that each of three voltages is sufficiently isolated and independent of the others to stabilize the entire power converter.

It is shown by the mode IV in FIG. 11 that the 100 nS after status PhaseA is for status PhaseD, the 100 nS after which is for status PhaseC, which is followed by status PhaseB.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A single-inductor multiple-output (SIMO) power converter for converting an input voltage to generate an output voltage and a biasing voltage, the SIMO power converter comprising:
an inductor configured to store energy from the input voltage;
a primary power switch with a control node, connected between the inductor and the output voltage, wherein the primary power switch is configured to deliver a first part of the energy to the output voltage; and
a control circuit configured to control the primary power switch, the control circuit comprising:
an auxiliary power switch, connected between the inductor and the biasing voltage, wherein the auxiliary power switch is configured to deliver a second part of the energy to the biasing voltage; and
a driver configured to drive the control node and to determine a signal level at the control node according to the biasing voltage, the biasing voltage performing as a power source for the driver;
wherein the auxiliary power switch delivers the second part of the energy to the biasing voltage in response to a turn-on voltage of the primary power switch, the turn-on voltage being a voltage drop across a conduction channel of the primary power switch when the primary power switch is turned on.

2. The SIMO power converter of claim 1, wherein the control circuit senses the turn-on voltage.

3. The SIMO power converter of claim 1, wherein the control circuit provides a negative feedback mechanism for regulating the turn-on voltage to be a predetermined value.

4. The SIMO power converter of claim 3, wherein when the turn-on voltage exceeds the predetermined value the auxiliary power switch turns ON at a predetermined time slot during a switching period.

5. The SIMO power converter of claim 3, wherein when the turn-on voltage is below or equal to the predetermined value the control circuit stops delivering energy to the biasing voltage.

6. The SIMO power converter of claim 1, comprising a boost converter powered by the input power, wherein both the output voltage and the biasing voltage exceed the input voltage.

7. The SIMO power converter of claim 6, wherein the primary power switch is an N-type power transistor, and the auxiliary power switch is a P-type power transistor.

8. The SIMO power converter of claim 6, wherein the auxiliary power switch is a second auxiliary power switch, the biasing voltage is a second biasing voltage, the driver is a second driver, and the primary power switch is a high-side power switch, the SIMO power converter further comprising:
a low-side power switch connected between the inductor and a ground line, the low-side power switch being configured to store the energy in the inductor when the low-side power switch turns on; and
a first auxiliary power switch connected between the inductor and a first biasing voltage, wherein the first auxiliary power switch is configured to deliver a third part of the energy to the first biasing voltage;
wherein the output voltage, the first biasing voltage and the second biasing voltage are outputs of the SIMO power converter; and
the control circuit further comprises a first driver configured to drive a control node of the low-side power switch and to determine a signal level at the control node of the low-side power switch according to the first biasing voltage, the first biasing voltage performing as a power source for the first driver.

9. The SIMO power converter of claim 8, wherein the first auxiliary power switch delivers the third part of the energy to the first biasing voltage in response to a turn-on voltage of the low-side power switch, so as to regulate the turn-on voltage of the low-side power switch to be a predetermined value, the turn-on voltage of the low-side power switch being another voltage drop across a conduction channel of the low-side power switch when the low-side power switch is turned on.

10. The SIMO power converter of claim 8, comprising a PWM generator determining a duty cycle of the low-side power switch in response to the output voltage and a reference voltage.

11. The SIMO power converter of claim 10, wherein the PWM generator comprises:
a latch comparator for comparing the output voltage with the reference voltage; and
a digital PWM generator for adjusting the duty cycle according to an output from the latch comparator.

12. The SIMO power converter of claim 8, wherein the control circuit comprises first and second power detectors, the high-side and the low-side power switches are connected via a joint node, the first power detector detects a voltage difference between the ground line and the joint node to control the first driver, and the second power detector detects a voltage difference between the output voltage and the joint node to control the second driver.

13. A method suitable for a single-inductor multiple-output (SIMO) power converter converting an input voltage to generate an output voltage and a biasing voltage, wherein the SIMO power converter comprises a primary power switch connected between an inductor and the output voltage, and an auxiliary power switch between the inductor and the biasing voltage, the method comprising:
storing energy in the inductor;
distributing the energy to the output voltage and the biasing voltage;
regulating the output voltage at a reference voltage;
sensing a turn-on voltage across the primary power switch, the turn-on voltage being a voltage drop across a conduction channel of the primary power switch when the primary power switch is turned on;
providing a pulse signal to control the auxiliary power switch in response to the turn-on voltage so as to maintain the turn-on voltage to be about a predetermined value; and
determining a signal level at a control node of the primary power switch according to the biasing voltage.

14. The method of claim 13, further comprising:
comparing the turn-on voltage with the predetermined value by using a latch comparator with a mismatched input pair.

15. The method of claim 13, wherein when the turn-on voltage is below or equal to the predetermined value the pulse signal is not provided and the auxiliary power switch is constantly turned off.

16. The method of claim 15, wherein, when the turn-on voltage exceeds the predetermined value, the pulse signal is provided during a predetermined time slot so as to turn ON the auxiliary power switch during the predetermined time slot.

17. The method of claim 13, wherein the step of regulating the output voltage comprises:

providing a PWM signal based on a difference between the output voltage and the reference voltage.

18. The method of claim 17, wherein the PWM signal is provided by a digital PWM generator according to an output from a latch comparator which compares the output voltage with the reference voltage.

19. The method of claim 13, wherein the primary power switch is a high-side power switch, the SIMO power converter further comprises a low-side power switch between a ground line and the inductor, and a second auxiliary power switch between the inductor and a second biasing voltage, and the method further comprises:
- sensing a second turn-on voltage across the low-side power switch, the second turn-on voltage being another voltage drop across a conduction channel of the low-side power switch when the low-side power switch is turned on;
- providing a second pulse signal to control the second auxiliary power switch in response to the second turn-on voltage so as to maintain the second turn-on voltage to be about a second predetermined value; and
- determining a signal level at a control node of the low-side power switch according to the second biasing voltage.

20. The method of claim 19, wherein the high-side and low-side power switches are NMOSFETs, and the first and second auxiliary power switched are PMOSFETs.

* * * * *